(12) United States Patent
Nakamura

(10) Patent No.: US 7,812,907 B2
(45) Date of Patent: Oct. 12, 2010

(54) FILM WITH ALIGNMENT FILM AND OPTICAL DEVICE

(75) Inventor: Runa Nakamura, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 444 days.

(21) Appl. No.: 11/817,337

(22) PCT Filed: Feb. 28, 2006

(86) PCT No.: PCT/JP2006/303721

§ 371 (c)(1),
(2), (4) Date: Aug. 29, 2007

(87) PCT Pub. No.: WO2006/093131

PCT Pub. Date: Sep. 8, 2006

(65) Prior Publication Data
US 2009/0268138 A1 Oct. 29, 2009

(30) Foreign Application Priority Data
Mar. 1, 2005 (JP) .............................. 2005-055771

(51) Int. Cl.
*G02F 1/1333* (2006.01)
(52) U.S. Cl. .................. 349/122; 349/123; 349/158
(58) Field of Classification Search ................. 349/158, 349/122, 123, 138, 93, 117, 187, 127
See application file for complete search history.

(56) References Cited

U.S. PATENT DOCUMENTS 7,388,637 B2 * 6/2008 Kawamoto et al. .......... 349/123
7,429,412 B2 * 9/2008 Nam et al. .................... 428/1.2
7,534,500 B2 * 5/2009 Kobayashi et al. .......... 428/457
2005/0134775 A1 * 6/2005 Chung et al. ................ 349/123

FOREIGN PATENT DOCUMENTS

JP    2001-305301    10/2001

(Continued)

OTHER PUBLICATIONS

Martin Schadt, et al; "Surface-Induced Parallel Alignment of Liquid Crystals by Linearly Polymerized Photopolymers"; Jpn.J.Appl.Phys. vol. 31(1992)Part 1, No. 7, Jul. 1992.

(Continued)

*Primary Examiner*—Thoi V Duong
(74) *Attorney, Agent, or Firm*—Ladas & Parry LLP

(57) ABSTRACT

A film with alignment film which stably causes liquid crystal alignment and is excellent in adhesion between its constituting layers so as to give a high endurance and an excellent re-workability, and further to provide an optical device using the same. The film with alignment film contains at least a resin substrate and an alignment film, wherein the film is provided with a photocurable resin layer between the resin substrate and the alignment film, the photocurable resin layer being formed by use of a photo-cleaving type photopolymerization initiator. The optical device contains at least a resin substrate, an alignment film, and an optically functional layer, wherein the device is provided with a photocurable resin layer between the resin substrate and the alignment film, the photocurable resin layer being formed by use of a photo-cleaving type photopolymerization initiator.

10 Claims, 1 Drawing Sheet

FOREIGN PATENT DOCUMENTS

| | | |
|---|---|---|
| JP | 2002-006136 | 1/2002 |
| JP | 2002-030024 | 1/2002 |
| JP | 2002-090532 | 3/2002 |
| JP | 2002-236216 | 8/2002 |
| JP | 2004-139084 | 5/2004 |
| WO | WO03/091288 | 11/2003 |

OTHER PUBLICATIONS

M. Nishikawa et al; "Effect of chemical structures of polyimides on photosensitivity of liquid crystal alignment using a polarized UV exposure" Liquid Crystals, 1999, vol. 26, No. 4.

* cited by examiner

FILM WITH ALIGNMENT FILM AND OPTICAL DEVICE

TECHNICAL FIELD

The present invention relates to a film with alignment film which has a function of aligning liquid crystal molecules and is used in an optical device or the like, and an optical device using the film with alignment film, specifically, an optical device such as a retardation film or a polarizing film.

BACKGROUND ART

A retardation film, such as an optical compensation film for optical compensation, is used in a liquid crystal display device in order to make compensation for light that should not be originally transmitted, which is based on optical strain of the liquid crystal display device or on some other factor, and improve optical performances of the liquid crystal display device, such as the viewing angle, the contrast and the color tone thereof. Examples of the retardation film include a film produced by stretching a polymer film monoaxially or biaxially, thereby orienting the main chain of the polymeric compound into a predetermined direction to cause the film to have birefringence; and a film wherein a liquid crystal compound is aligned or oriented on a base film.

In the case of adopting a form in which a liquid crystal compound is aligned on a base film, usually, an alignment film having a function of regulating the alignment direction of the liquid crystal compound is formed on the base film and the liquid crystal compound is aligned on the alignment film. It is known that polyimide, polyvinyl alcohol or some other polymer has alignment property. It is known that a layer of the polymer is formed on a base film and then the resultant is subjected to orienting treatment such as rubbing treatment, thereby forming an alignment film. An example of an aligning method without using rubbing treatment is a method of forming an alignment film by photodimerization reaction, photodecomposition reaction, or photoisomerization reaction. For example, Non-Patent Document 1 discloses a method of controlling the direction along which crosslinked bonds are generated in a polyvinyl cinnamate alignment film by irradiating with polarized ultraviolet rays, and Non-Patent Document 2 discloses a method of causing decomposition reaction of a polyimide alignment film to have anisotropy by irradiating with ultraviolet rays. Besides, it is known that an alignment film is formed by subjecting an inorganic compound to oblique evaporation. However, any alignment film of a polymer layer is more preferred, considering productivity.

However, most of the latest optical devices use a plastic film as a substrate. Accordingly, when an alignment film-forming coating solution is coated on a substrate in order to form an alignment film of a polymer layer on the substrate, the substrate surface may be dissolved in a solvent in the coating solution depending on the kind of the substrate so that additives, such as a plasticizer, in the substrate may elute out into the alignment film. There is a problem that, in such a case, when an optically functional layer is formed on the alignment film, the alignment of a liquid crystal therein may be inhibited. For this reason, it is suggested that a protective layer is formed between an alignment film and a substrate, thereby expressing liquid crystal alignment property stably (for example, Patent Documents 1 to 4).

Patent Document 1: Japanese Patent Application Laid-Open No. 2001-305301

Patent Document 2: Japanese Patent Application Laid-Open No. 2002-6136

Patent Document 3: Japanese Patent Application Laid-Open No. 2002-90532

Patent Document 4: Japanese Patent Application Laid-Open No. 2002-236216

Non-Patent Document 1: M. Schdt et al, JPN. J. Appl. Phys, 31, p 2155-2164 (1992)

Non-Patent Document 2: M. Nishikawa et al, Liquid Crystals, 26, p 575-580 (1990)

DISCLOSURE OF THE INVENTION

Problems to be Solved by the Invention

However, when such a protective layer is formed, the adhesion between the protective layer and the alignment film becomes weak to cause a problem in endurance or a problem in re-workability that the optical device does not endure repeated use. Thus, there arises a problem that the yield of the process deteriorates. As a method for improving the adhesion, suggested is surface treatment (such as glow discharge treatment, plasma treatment, corona discharge treatment, UV treatment or flame treatment) of the protective layer, or the like. In this case, the following problems are caused: an additional device is required; the number of steps increases; the adhesion is not uniform because of unevenness of the treatment; and due to the treatment, the alignment performance of the alignment film formed thereon is inhibited. In particular, the non-uniformity of the adhesion due to the unevenness of the treatment, and the inhibition of the alignment performance become problems.

An object of the invention is to solve the above-mentioned problems and provide a film with alignment film which stably causes liquid crystal alignment and is excellent in adhesion between its constituting layers so as to give a high endurance and an excellent re-workability, and further to provide an optical device using the same.

Means for Solving the Problems

The present invention provides a film with alignment film comprising at least a resin substrate and an alignment film, wherein the film is provided with a photocurable resin layer between the resin substrate and the alignment film, the photocurable resin layer being formed by use of a photo-cleaving type photopolymerization initiators thereby solving the above-mentioned problems.

The invention also provides an optical device comprising at least a resin substrate, an alignment film, and an optically functional layer, wherein the device is provided with a photocurable resin layer between the resin substrate and the alignment film, the photocurable resin layer being formed by use of a photo-cleaving type photopolymerization initiator, thereby solving the above-mentioned problems.

In the invention, the photocurable resin layer, which is formed by use of a photo-cleaving type photopolymerization initiator, is present between the resin substrate and the alignment film, thereby providing a film with alignment film and an optical device which each stably cause liquid crystal alignment and are each excellent in adhesion between constituting layers so as to give a high endurance and an excellent re-workability.

In other words, the photocurable resin layer between the resin substrate and the alignment film in the invention is cured; therefore, the layer is excellent in solvent resistance, and the layer is not dissolved in any solvent contained in a coating solution for forming the alignment film at the time of forming the alignment film on the photocurable resin layer, so that additives and others can be prevented from eluting out to the alignment film. As a result, the alignment film can express liquid crystal alignment or orientation stably. Moreover, the photocurable resin layer is photocured by use of the photo-cleaving type photopolymerization initiator; thus, the adhesive thereof to the alignment film becomes high so that the endurance is high and the re-workability is excellent.

In the invention, it is preferred that the alignment film comprises a photo-alignment material which is irradiated with polarized ultraviolet rays so as to gain alignment performance. In this case, static electricity, or dust and dirt are less generated than in aligning methods based on rubbing. Thus, even if the area thereof is large, uniform alignment can be attained. Furthermore, it is easy to set an arbitrary orientation angle for a long substrate.

In the invention, it is preferred from the viewpoint of adhesion and alignment that the photo-cleaving type photopolymerization initiator is one or more selected from the group consisting of acetophenone derivatives, phosphine oxide derivatives, bisimidazole derivatives, and titanocene derivatives.

In the invention, the resin substrate is preferably a cellulose-based polymer from the viewpoint of adhesiveness to polyvinyl alcohol (PVA), which is a raw material of polarizing plates, general versatility and optical properties. When the resin substrate is a cellulose-based polymer, in particular, a plasticizer and others tend more to elute out from the resin substrate to the alignment film by effect of a solvent in a coating solution for forming the alignment film. Therefore, the case that the resin substrate is a cellulose-based polymer is particularly preferred since the advantageous effect of the invention that the alignment is stably expressed is more effectively brought about.

Effects of the Invention

The film with alignment film according to the invention is a film which stably causes liquid crystal alignment and is excellent in adhesion between its constituting layers so as to give a high endurance and an excellent re-workability.

The optical device according to the invention is an element wherein its alignment film stably expresses liquid crystal orientation so as to make it possible to form an optically functional layer satisfactorily. Thus, this element is a member which gives excellent element characteristics and is excellent in adhesion so as to give a high endurance and an excellent re-workability.

EXPLANATION OF REFERENCE NUMERALS

1: substrate
2: photocurable resin layer
3: alignment film
4: optically functional layer

BEST MODE FOR CARRYING OUT THE INVENTION

The invention will be described in detail hereinafter.

In the invention, (meth)acrylate means either acrylate or methacrylate, and (meth)acryloyl means either an acryloyl group or a methacryloyl group.

In the invention, light may be any electromagnetic wave that has an energy (quanta) sufficient for crosslinking or polymerizing a photocurable resin, and includes visible rays, electromagnetic waves having a wavelength in the ultraviolet ray range, and radial rays.

1. Film with Alignment Film

The film with alignment film according to the invention comprises at least a resin substrate, and an alignment film, and has a photocurable resin layer between the resin substrate and the alignment film, the photocurable resin layer being formed by use of a photo-cleaving type photopolymerization initiator.

In the invention, the photocurable resin layer between the resin substrate and the alignment film is cured; therefore, the layer is excellent in solvent resistance, and the layer is not dissolved in any solvent contained in a coating solution for forming the alignment film at the time of forming the alignment film on the photocurable resin layer, so that additives and others in the substrate can be prevented from eluting out to the alignment film. As a result, the alignment film can cause liquid crystal alignment stably. Moreover, the photocurable resin layer is photocured by use of the photo-cleaving type photopolymerization initiator; thus, the adhesion thereof to the alignment film becomes high so that the durability is high and the re-workability is excellent. The reason why the adhesion of the photocurable resin layer is made high by being photocured by use of the photo-cleaving type photopolymerization initiator is estimated to be that the photopolymerization initiator on the surface of the photocurable resin layer is decomposed so as not to remain. Furthermore, the alignment is also expected to be improved for the same reason.

Figure 1:
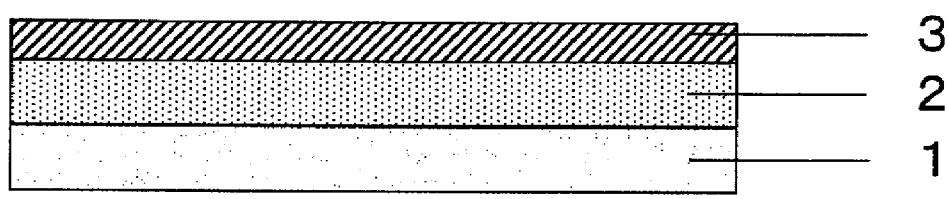
FIG. 1 is a view illustrating the layer structure of a film with alignment film of the invention.

In FIG. 1, an example of the layer structure of the film with alignment film according to the invention is illustrated. In FIG. 1, reference number 1 represents a resin substrate; 2 represents a photocurable resin layer formed on the resin substrate 1; and 3 represents an alignment film formed on the photocurable resin layer.

[Resin Substrate]

The kind of the resin substrate is decided in accordance with the usage of a target optical device. When the optical device is used as a retardant plate, a polarizer, or an optical compensation sheet of a color filter for display or the like, a transparent polymer film is used as the resin substrate. Being "transparent" means an optical transparency is 80% or more in the visible ray range.

Examples of the material of the transparent polymer film include cellulose-based polymers; norbornene-based polymers such as a polymer named ARTON (manufactured by JSR Corporation) and a polymer named ZEONEX (manufactured by Zeon Corporation); cycloolefin-based polymers such as a polymer named ZEONOA (manufactured by Zeon Corporation) and polymethyl methacrylate.

A cellulose-based polymer as the resin substrate in the invention is suitably used since the polymer is advantageous in adhesiveness to PVA, which is a raw material of a polarizing plate, general versatility, and so on. Examples of the cellulose-based polymer include cellulose esters. Among them, lower aliphatic acid esters of cellulose can be suitably used. Lower aliphatic acid means any aliphatic acid having 6 or less carbon atoms. The number of the carbon atoms is preferably 2 (cellulose acetate), 3 (cellulose propionate) or 4 (cellulose butylate). As the cellulose esters, cellulose acetate is preferred. Examples thereof include diacetylcellulose and triacetylcellulose. A mixed aliphatic acid ester such as cellulose acetate propionate or cellulose acetate butylate may be used.

When the target optical device is required to have optical isotropy, an optically isotropic polymer film is used as the resin substrate. Examples thereof include films made of a cellulose ester such as triacetylcellulose, a cycloolefin-based polymer and a norbornene-based polymer.

An optically anisotropic polymer film may be used as the transparent polymer film depending on the liquid display mode. For the optically anisotropic polymer film, there is used polycarbonate, polysulfone, polyethersulfone, polyetheretherketone, poly(meth)acrylate, a norbornene-based polymer, an optically anisotropic cellulose ester, or the like. The optically anisotropic polymer film is generally obtained by stretching treatment. The optically anisotropic cellulose ester film is obtained by the use of a retardation booster, the decrease in the acetification degree of cellulose acetate, and the production of a film by a cooling dissolution process.

The thickness of the resin substrate is preferably from 20 to 500 μm, more preferably from 50 to 200 μm.

In order to improve the adhesion between the resin substrate and the photocurable resin layer, the resin substrate may be subjected to surface treatment (such as glow discharge treatment, corona discharge treatment, ultraviolet ray treatment, or flame treatment).

[Photocurable Resin Layer]

In the invention, the photocurable resin layer is formed by use of a photo-cleaving type photopolymerization initiator, and is a layer obtained by curing a layer containing at least a photopolymerizable compound and a photo-cleaving type photopolymerization initiator by irradiation with light. In the invention, the photocurable resin layer prevents a plasticizer and others from eluting out from the resin substrate when the alignment film is formed, and further improves the adhesion to the alignment film, thereby improving the alignment property, the endurances such as the solvent resistance and the heat resistance, the re-workability, and others.

The photo-cleaving type photopolymerization initiator is an agent which absorbs light to be activated (excited) so that cleavage reaction is caused to generate radical molecules for causing three-dimensional polymerization or crosslinking reaction of an oligomer or a monomer.

Examples of the photo-cleaving type photopolymerization initiator include acetophenone derivatives such as 1-hydroxycyclohexyl-phenyl-ketone, 2,2-diethoxyacetophenone, 2-methyl-1[4-(methylthio)phenyl-2-morpholinopropane-1-one, 2-benzyl-2-dimethylamino-1-(4-morpholinophenyl)-butane-1, and benzylketal; phosphine oxide derivatives such as acylphosphine oxide; bisimidazole derivatives such as hexaallylbisimidazole; and titanocene derivatives.

The photo-cleaving type photopolymerization initiator is preferably one or more selected from the group consisting of acetophenone derivatives, phosphine oxide derivatives, bisimidazole derivatives, and titanocene derivatives from the viewpoint of adhesion and alignment property. Furthermore, the photo-cleaving type photopolymerization initiator is preferably an acetophenone derivative since the transparency of the resultant photocurable resin layer becomes high and the layer is less yellowed by ultraviolet rays.

The photo-cleaving type photopolymerization initiator can be added into the photocurable resin layer in an amount ranging from 0.01 to 20% by mass, preferably from 0.1 to 10% by mass, and more preferably from 0.5 to 5% by mass.

A sensitizer may be used together as long as the advantageous effects of the invention are not inhibited. Examples of the sensitizer include thioxanthone, acetophenone, and benzophenone.

The photopolymerizable compound used in the photocurable resin layer is not particularly limited as long as a compound having such a photopolymerization reactivity that polymerization can proceed by aid of the above-mentioned photopolymerization initiator. The photopolymerizable compound preferably has an ethylenically unsaturated bond that can be polymerized by irradiation with light as the polymerizable functional group. Examples of the ethylenically unsaturated bond include vinyl, ally, (meth)acryloyl, and isopropenyl groups. Among them, (meth)acryloyl group is preferred from the viewpoint of the polymerization rate and reactivity thereof. A polyfunctional monomer and/or oligomer having in the molecule thereof plural polymerizable functional groups are advantageous since they are sufficiently crosslinked in the curing step by irradiation with light to form a network-like matrix, whereby the heat resistance and the solvent resistance are improved. As the photopolymerizable compound, a single species thereof or a mixture of two or more species thereof may be used.

Examples of the photopolymerizable compound include monofunctional, bifunctional and polyfunctional (meth)acrylate monomers and (meth)acrylate oligomers.

Examples of the monofunctional (meth)acrylate monomer include aliphatic (meth)acrylates such as 2-ethylhexyl(meth)acrylate, lauryl(meth)acrylate, and isooctyl(meth)acrylate; ether(meth)acrylates which have a skeleton to which ethylene oxide or propylene oxide is added, such as carbitol (meth)acrylate, 2-ethylhexylcarbitol(meth)acrylate, and methoxytripropylene glycol(meth)acrylate; cyclic ether(meth)acrylates, which have ethylene oxide, trimethylene oxide, tetrahydrofuran or some other skeleton, such as tetrahydrofurfuryl(meth)acrylate; hydroxyl-containing (meth)acrylates such as 2-hydroxyethyl(meth)acrylate, 4-hydroxybutyl (meth)acrylate, and 2-hydroxylpropyl(meth)acrylate; and aromatic (meth)acrylates such as benzyl(meth)acrylate, phenoxyethyl(meth)acrylate, and nonylphenoxyethyl(meth)acrylate.

Examples of the polyfunctional (meth)acrylate monomer include bifunctional (meth)acrylates such as 1,6-hexanediol di(meth)acrylate, neopentyl glycol di(meth)acrylate, ethylene glycol di(meth)acrylate, and isocyanuric acid ethylene oxide modified di(meth)acrylate; trifunctional (meth)acrylates such as pentaerythritol tri(meth)acrylate, trimethylolpropane tri(meth)acrylate, and isocyanuric acid ethylene oxide modified tri(meth)acrylate; tetrafunctional (meth)acrylates such as pentaerythritol tetra(meth)acrylate, and dipentaerythritol tetra(meth)acrylate; pentafunctional (meth)acrylates such as pentaerythritol penta(meth)acrylate, and dipentaerythritol penta(meth)acrylate; and hexafunctional (meth)acrylates such as pentaerythritol hexa(meth)acrylate, dipentaerythritol hexa(meth)acrylate, and caprolactone modified dipentaerythritol hexa(meth)acrylate.

Examples of the (meth)acrylate oligomer (or prepolymer) include any epoxy(meth)acrylate that is obtained by addition reaction between a glycidyl ether and (meth)acrylic acid or a monomer having a carboxylic acid salt group; any urethane (meth)acrylate that is obtained by addition reaction between a reaction product made from a polyol and a polyisocyanate and a (meth)acrylate having a hydroxyl group; any polyester acrylate that is obtained by esterification of a polyesterpolyol made from a polyol and a polybasic acid with (meth)acrylic acid; and any polybutadiene(meth)acrylate, which is a (meth) acrylic compound having a polybutadiene skeleton or a hydrogenated polybutadiene skeleton.

Examples of the glycidyl ether, which is used for the above-mentioned epoxy(meth)acrylate, include 1,6-hexanediglycidyl ether, polyethylene glycol glycidyl ether, bisphenol A type epoxy resin, naphthalene based epoxy resin, cardoepoxyresin, glycerol triglycidyl ether, and phenol novolak type epoxy resin.

Examples of the polyol, which is used for the above-mentioned urethane (meth)acrylate, include 1,6-hexanediglycidyl ether, polyethylene glycol, polypropylene glycol, polytetramethylene glycol, polycaprolactone diol, polycarbonate diol, polybutadiene polyol, and polyester diol. Examples of the polyisocyanate, which is used for the above-mentioned urethane(meth)acrylate, include tolylene diisocyanate, xylylene diisocyanate, diphenylmethane diisocyanate, tetramethylxylene diisocyanate, hexamethylene diisocyanate, isophorone diisocyanate, and dicyclohexylmethane diisocyanate. Examples of the hydroxyl-containing (meth)acrylate, which is used for the above-mentioned urethane(meth)acrylate, include 2-hydroxyethyl(meth)acrylate, 2-hydroxypropyl(meth)acrylate, 4-hydroxybutyl(meth)acrylate, pentaerythritol(meth)acrylate, and caprolactone modified 2-hydroxyethyl(meth)acrylate.

Examples of the polyol for forming the polyesterpolyol, which is used for the above-mentioned polyester acrylate, include ethylene glycol, polyethylene glycol, propylene glycol, polypropylene glycol, neopentyl glycol, 1,4-butanediol, trimethylolpropane, and pentaerythritol. Examples of the polybasic acid include succinic acid, adipic acid, sebacic acid, phthalic acid, isophthalic acid, terephthalic acid, trimellitic acid, and pyromellitic acid.

In the case that the resin substrate is made of untreated triacetylcellulose, it is preferred from the viewpoint of the adhesion of the photopolymerizable compound to the resin substrate that the photopolymerizable compound contains at least pentaerythritol tri(meth)acrylate, isocyanuric acid ethylene oxide modified di(meth)acrylate, isocyanuric acid ethylene oxide modified tri(meth)acrylate, or caprolactone modified dipentaerythritol hexa(meth)acrylate.

The photocurable resin layer can be formed by coating, onto the resin substrate, a coating solution which contains at least the photopolymerizable compound and the photo-cleaving type photopolymerization initiator, and optionally contains a solvent and others, drying the resultant, and then radiating light onto the dried layer. If necessary, the coating solution may further contain a polymerization inhibitor (a storage stabilizer), a sensitizer, a leveling agent, an antifoamer or the like.

Examples of the method for coating the coating solution include wire bar coating, extrusion coating, direct gravure coating, reverse gravure coating, micro-gravure coating, die coating, spin coating, roll coating, dip coating, and curtain coating methods.

The photocuring is preferably performed by irradiation with ultraviolet rays. The total radiation energy necessary for the curing is usually from about 20 to 1000 mJ/cm$^2$.

The film thickness of the photocurable resin layer is not particularly limited, and is appropriately from 0.1 to 20 μm, more preferably from 1 to 10 μm. If the film thickness is too small, it is difficult to prevent completely a plasticizer and others from eluting out from the substrate. Also, if the film thickness is too large, when an optical device is present on the film, there may be caused curling which follows hardening shrinkage thereof, coloring and other problems.

[Alignment Film]

The alignment film in the invention is not particularly limited, and is suitably a film made of an organic compound and formed by use of a solvent, a typical example of which is polymer layer, since the photocurable resin layer, which is high in solvent resistance, is formed on the substrate. The alignment film may be formed by using a polymer which gains alignment performance by rubbing and rubbing the polymer. In the invention, the alignment film is preferably a film containing a photo-alignment material which can gain alignment performance by irradiation with polarized ultraviolet rays. In this case, static electricity or dust and dirt are less generated than in aligning methods based on rubbing. Thus, even if the area thereof is large, uniform alignment can be attained. Furthermore, it is easy to set an arbitrary orientation angle for a long substrate.

The photo-alignment material, which gains alignment performance by irradiation with polarized ultraviolet rays, may be a material which can gain alignment performance at least by photoisomerization reaction, photodimerization or the like.

Examples thereof include materials depending on photoisomerization, such as an azo benzene group, materials depending on photodimerization reaction, such as a cinnamoyl group, a coumarin group, a chalcone group and a benzophenone group, materials depending on photolysis, such as polyimide resin. As the photo-alignment material using photoisomerization, photodimerization or photolysis, a macromolecular compound, such as polymer, is used in many cases so that a uniform film can be obtained when coated onto the substrate. Thus, in many cases, a constituting unit exhibiting photo-alignment property, such as an azo benzene group or a cinnamoyl group, is introduced into a side chain or the main chain of this macromolecular compound. In some cases, a molecule having photo-alignment as a guest molecule is dispersed in a host compound of a macromolecular compound.

It is possible to use a resin which can be photoisomerized and has constituting units showing dichroism and a reactive functional group, as disclosed in WO 9637807. It is also possible to use a photo-alignment material wherein a compound having a maleimide group, which is a photopolymerizable group which does not require any polymerization initiator, is used, as disclosed in Japanese Patent Application Laid-Open No. 2000-53766, Japanese Patent No. 2962473, and Japanese Patent Application Laid-Open No. 2002-265442.

The photo-alignment material which gains alignment performance by irradiation with polarized ultraviolet rays is in particular preferably a material having one or more functional groups selected from the group consisting of cinnamoyl, coumarin, chalcone, and azo groups from the viewpoint of the radiation amount of the polarized ultraviolet rays. The material is preferably a material having a functional group which causes photodimerization, such as a cinnamoyl, coumarin or chalcone group from the viewpoint of the stability of the alignment state. This is because molecules thereof are crosslinked with each other by irradiation with polarized ultraviolet rays so that the alignment state is stabilized.

If necessary, a polymerizable monomer, a filler or the like may be added to the alignment film as long as the alignment performance is not inhibited.

In the invention, the alignment film can be formed by coating a coating solution for forming the alignment film onto the photocurable resin layer, drying the resultant, and appropriately performing radiation of polarized ultraviolet rays or rubbing to give alignment performance thereto. The coating solution is coated on the photocurable resin layer, which is high in solvent resistance; therefore, the solvent used in the coating solution for forming the alignment film is not particularly limited as long as the solvent is a solvent in which materials for the alignment film, such as the above-mentioned photo-alignment material, are dissolved.

The film thickness of the formed alignment film ranges preferably from 0.01 to 10 μm. If the film thickness is more than 10 μm, coloration of the alignment film may make the transparency of an optical device low and further the alignment property may deteriorate.

The film with alignment film according to the invention can be suitably used as a substrate for aligning a liquid crystal in an optical device as described below.

2. Optical Device

The optical device according to the invention is containing at least a resin substrate, an alignment film, and an optically functional layer, wherein the device is provided with a photocurable resin layer between the resin substrate and the alignment film, the photocurable resin layer being formed by use of a photo-cleaving type photopolymerization initiator.

Figure 2:
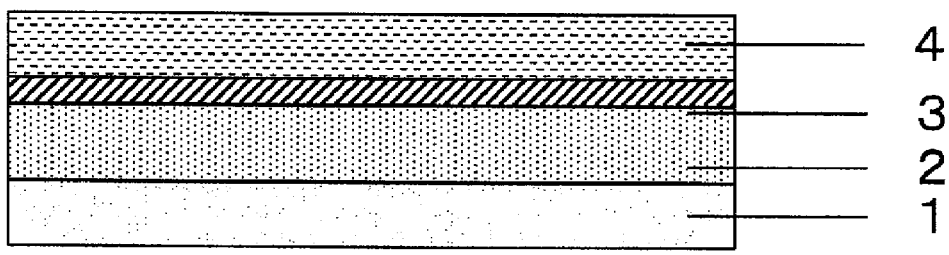
FIG. 2 is a view illustrating the layer structure of an optical device of the invention.

The layer structure of an example of the optical device according to the invention is illustrated in FIG. 2. In FIG. 2, reference number 1 represents a resin substrate; 2 represents a photocurable resin layer formed on the resin substrate 1; 3 represents an alignment film formed on the photocurable resin layer 2; and 4 represents an optically functional layer formed on the alignment film 3. Examples of an optical device having such a lamination structure include a retardant plate, a polarizing element, and a color filter for display.

In the optical device according to the invention, as its resin substrate, photocurable resin layer and alignment film, the same as in the film with alignment film according to the invention can be used. Thus, description thereof is not provided here.

[Optically Functional Layer]

As the optically functional layer, a nematic liquid crystal or a cholesteric liquid crystal can be used. Such a material is not particularly limited as long as the material is a liquid crystal material which can form a liquid crystal having nematic regularity, smectic regularity or cholesteric regularity when the optically functional layer is made only of this material. The liquid crystal material may be any one of a polymer liquid crystal and a polymerizable liquid crystal compound. The optically functional layer may be a layer wherein two or more liquid crystal layers are laminated on each other.

When the optically functional layer is formed by use of a polymer liquid crystal, the layer is obtained by coating a solution wherein the polymer liquid crystal and other compounds are dissolved in a solvent onto the alignment film, drying the resultant, next heating the dried product up to a liquid crystal phase forming temperature, and then cooling the heated product while keeping the alignment state thereof.

An example of such a polymer liquid crystal is a polymer having recurring units each represented by the following general formula (1).

[Chem. 1]

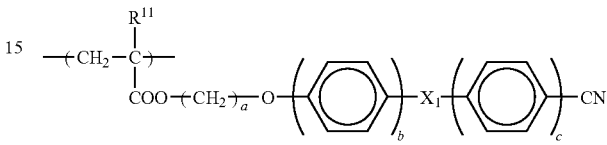

General formula (1)

(In the formula, $R^{11}$ represents a hydrogen atom or a methyl group, $X_1$ represents a —COO-group or a —OCO-group, a represents a positive integer of 1 to 6, and b and c each independently represent 1 or 2 (provided that the following is satisfied: $b+c \leqq 3$.))

The liquid crystal material used in the optically functional layer in the invention is more preferably a polymerizable liquid crystal compound. In order to form the optically functional layer, it is necessary to fix the alignment state of the liquid crystal material; as regards the polymerizable liquid crystal compound, the alignment state thereof can be fixed by irradiation thereof with light or the like, and further the alignment of the liquid crystal can be usually attained with ease at a relatively low temperature. Furthermore, regardless of conditions for the use thereof, such as temperature, an optical device can be used since the alignment state is fixed. Moreover, it is preferred for the polymerizable liquid crystal compound to have polymerizable functional groups at both terminals of the molecule in order to give an optical device good in heat resistance.

The polymerizable liquid crystal compound is in particular preferably a liquid crystal compound having an ethylenically unsaturated bond that can be polymerized in the presence of a photopolymerization initiator by irradiation with ultraviolet rays. It is more preferable that the liquid crystal compound has polymerizable functional groups at both terminals of the molecule, such as (meth)acryloyloxy groups in order to give an optical device good in heat resistance. As regards such a polymerizable liquid crystal compound, one species thereof may be used, and a mixture of two or more species thereof can be used to enlarge the temperature range in which liquid crystallinity is exhibited, or to control the birefringence.

An example of such a polymerizable liquid crystal compound is a compound represented by a general formula (2) illustrated below, which will be referred to as the compound (I), or any compound illustrated below. As the compound (I), a mixture of two species of the compound represented by the general formula (2) can be used. As the polymerizable liquid crystal compound, a mixture of two or more species of the compound represented by the general formula (2) and the following compounds can be used.

[Chem. 2]
General formula (2)
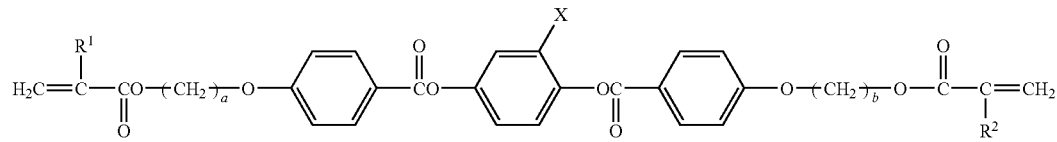
[Chem. 3]
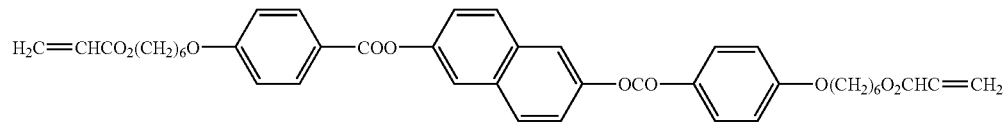
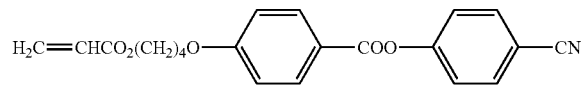
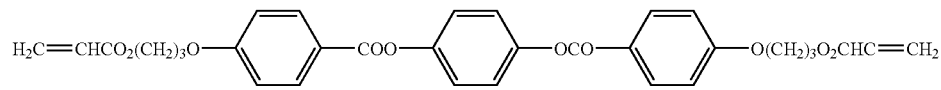
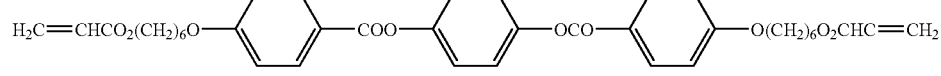
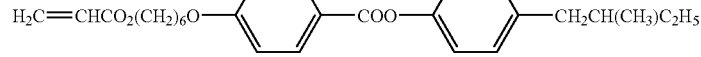
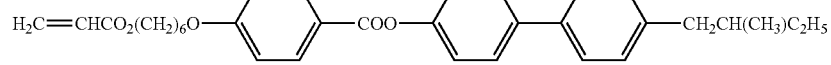
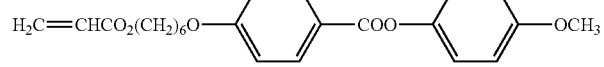
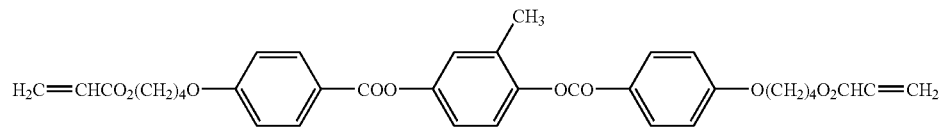
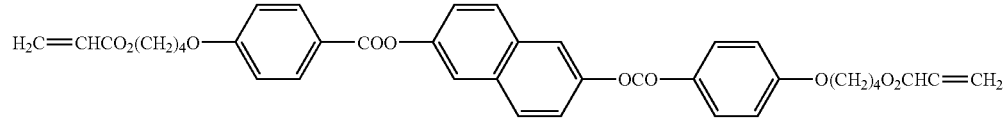
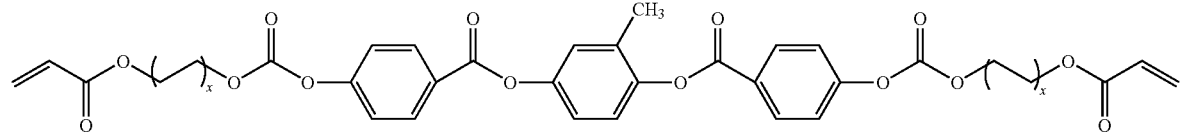
x is an integer of 2 to 5

In the general formula (2), $R^1$ and $R^2$ each represent hydrogen or a methyl group. It is preferred that $R^1$ and $R^2$ are each hydrogen from the viewpoint of the broadness of the humidity range in which the compound gives a liquid crystal layer. X may represent any one of hydrogen, chlorine, bromine, iodine, alkyl groups having 1 to 4 carbon atoms, a methoxy group, a cyano group, and a nitro group, and is preferably chlorine or a methyl group. Moreover, a and b, which each represent the chain length of the alkylene group which is a spacer between one of the (meth)acryloyloxy groups at both ends of the molecular chain of the compound (I) and one of the aromatic rings, may be each independently any integer ranging from 2 to 12, preferably from 4 to 10, and more preferably from 6 to 10.

The compound (I) wherein a=b=0 is poor in stability, is easily hydrolyzed, and is also high in crystallinity of the compound itself. The compound (I) wherein a and b are each 13 or more is low in isotropic transition temperature (TI). For these reasons, these compounds each have a narrow temperature range in which liquid crystallinity is exhibited, so as not to be preferred.

As the above-mentioned examples, examples of the polymerizable liquid crystal monomer have been given. In the invention, however, a polymerizable liquid crystal oligomer, a polymerizable liquid crystal polymer, or the like can be used. As such a polymerizable liquid crystal oligomer or a polymerizable liquid crystal polymer, one that has been suggested in the prior art is appropriately selected and can be used.

Also, a chiral nematic liquid crystal having cholesteric regularity, wherein a chiral agent is added to a nematic liquid crystal, can be suitably used in the invention. The chiral agent means a low molecular weight compound having an optically active moiety and having a molecular weight of 1500 or less. The chiral agent is used mainly to induce a spiral pitch to positive monoaxial nematic regularity that the compound (I) expresses. As long as this purpose is attained, the kind of low molecular weight compounds described below as the chiral agent is not particularly limited if the chiral agent is compatible with the compound (I) or the above-mentioned compound in a solution or melt state and can induce a desired spiral pitch to the above-mentioned polymerizable liquid crystal compound, which can have nematic regularity, without inhibiting the liquid crystallinity thereof. The chiral compound is preferably an agent having polymerizable functional groups at both ends of the molecule in order to give an optical device good in heat resistance. It is essential that the chiral agent used to induce a spiral pitch to a liquid crystal has at least any chirality in the molecule thereof. Accordingly, examples of the chiral agent which can be used in the invention include a compound having one or more asymmetric carbon atoms, a compound wherein an asymmetric point is present on a hetero atom, such as a chiral amine or a chiral sulfoxide, and a compound having an axial asymmetry, such as cumulene or binaphthol. Specific examples thereof include commercially available chiral nematic liquid crystals, such as S-81 (trade name) manufactured by Merck & Co, Inc.

However, depending on the nature of a selected chiral agent, it is possible that the nematic regularity that the compound (I) forms is broken, the orientation deteriorates, or when the compound is not polymerizable, the curability of the liquid crystal composition lowers or the reliability of the cured film lowers. Furthermore, if a chiral agent having an optically active moiety is used in a large amount, costs of the composition rise. Accordingly, in the case of producing a circular polarization controlling optical device having cholesteric regularity of a short pitch, it is preferred to select a chiral agent which largely produces an effect for inducing a spiral pitch as the chiral agent having an optically active moiety, which is to be incorporated into the liquid crystal composition. Specifically, it is preferred to use a low molecular weight compound (II) having in the molecule thereof an axial asymmetry, as illustrated in the following general formula (3), (4) or (5):

[Chem. 4]

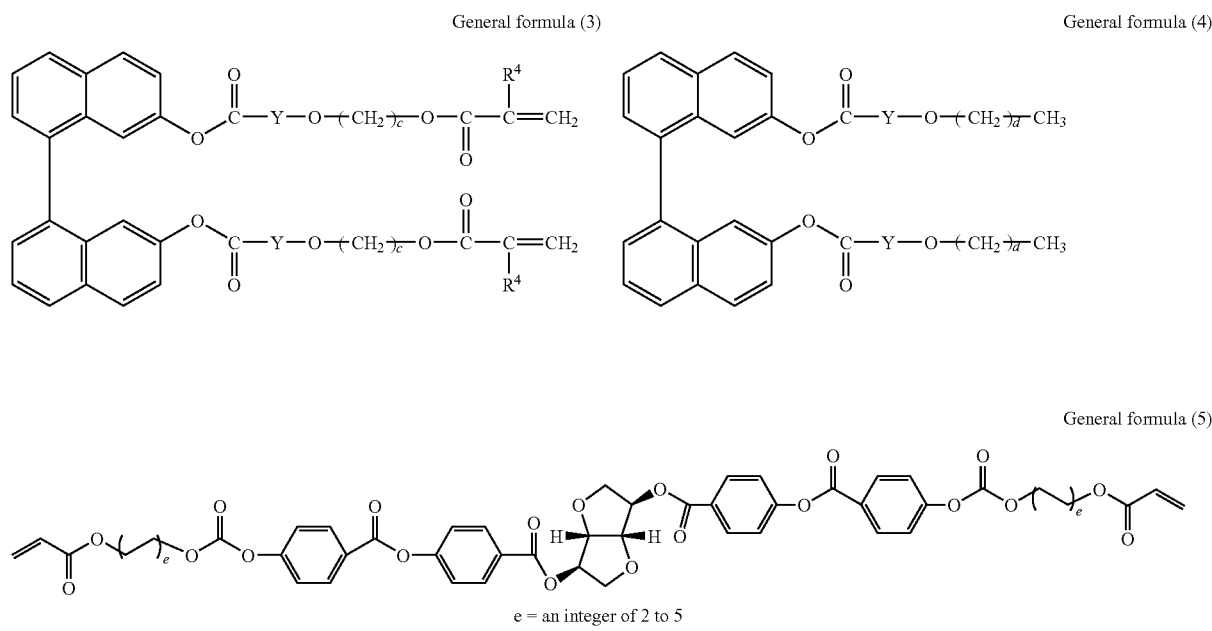

e = an integer of 2 to 5

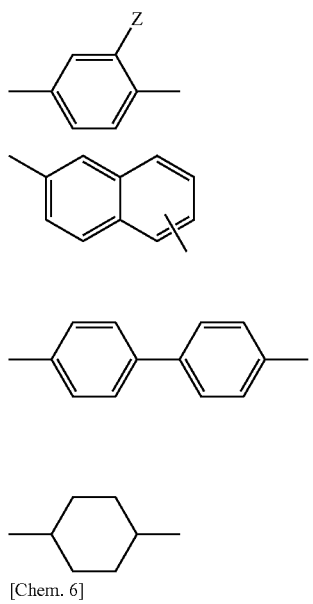
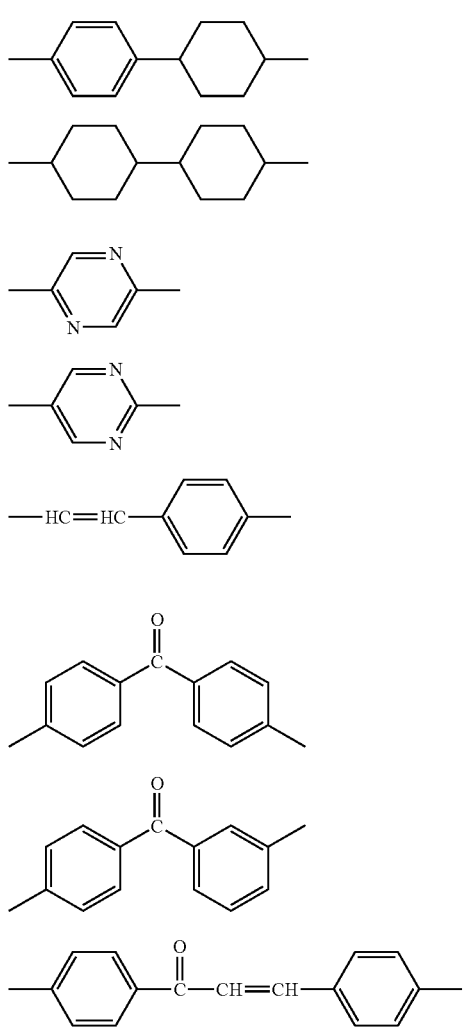
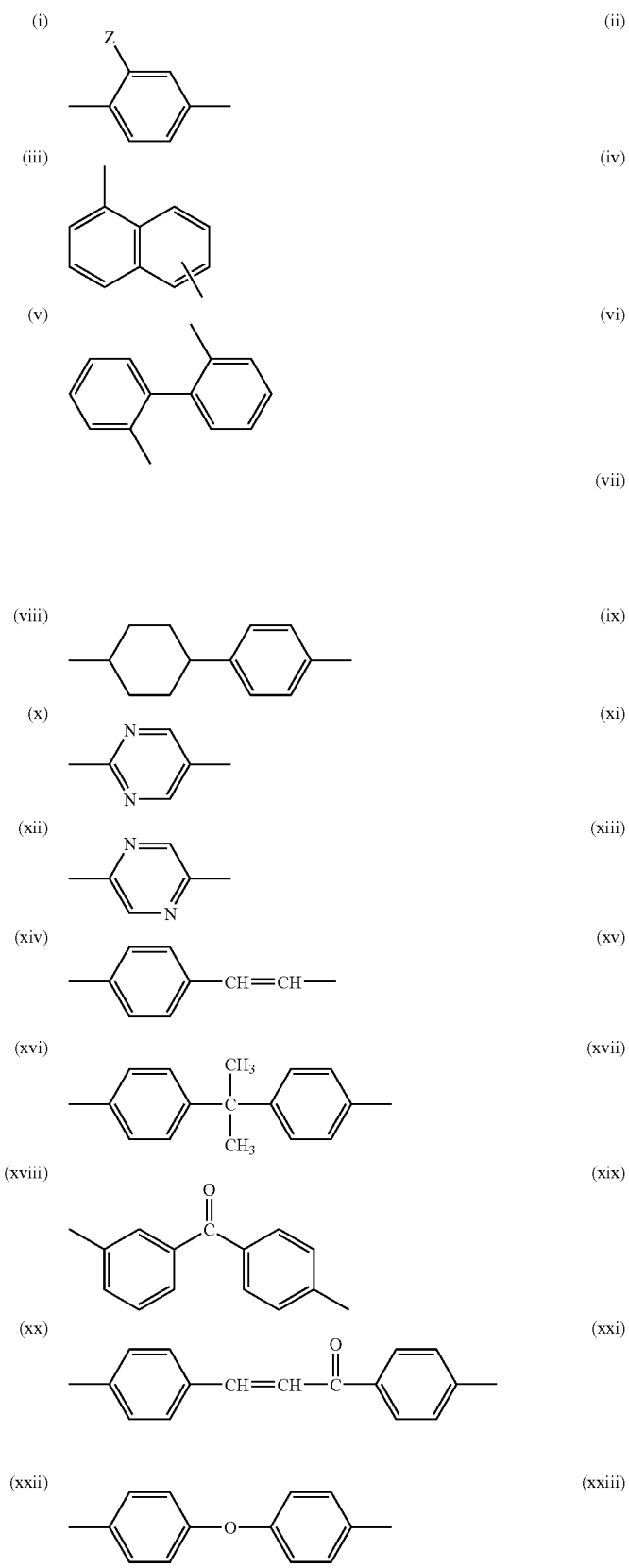

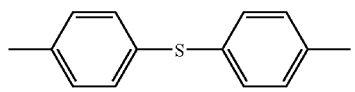
(xxiv)

In the general formula (3), (4) or (5), which represents the chiral agent (II), $R^4$ represents a hydrogen or a methyl group. Y represents any one of the above-mentioned formulae (i) to (xxiv) It is particularly preferred that Y is any one of the formulae (i), (ii), (iii), (v) and (vii). The symbols c and d, which each represent the chain length of one of the alkylene groups, may be each independently any integer ranging from 2 to 12, preferably from 4 to 10, and more preferably from 6 to 10.

The compound represented by the general formula (3) or (4) wherein the value of c or d is 0 or 1 lacks stability so as to be easily hydrolyzed, and is also high in crystallinity. On the other hand, the compound wherein the value of c or d is 13 or more has a low melting point (Tm). These compounds are low in compatibility with the compound (I) which exhibits liquid crystallinity, and it is possible that the compounds cause phase separation or the like depending on the concentration thereof.

The optimal amount of the chiral agent blended with the polymerizable liquid crystal compound in the invention is decided considering the capability of inducing a spiral pitch or the cholesteric property of the optical device to be finally obtained. Specifically, the amount, which largely varies depending on the used polymerizable liquid crystal compounds, is selected from the range of 0.01 to 60 parts by mass, most preferably 1 to 20 parts by mass for 100 parts by mass of the whole of the polymerizable liquid crystal compounds. If the blend amount is over the range, the alignment of the molecules is inhibited so that an adverse effect may be produced when the compound is cured by an active radial ray. If the amount is small, a sufficient cholesteric property may not be given.

In the invention, it not particularly essential that such a chiral agent has polymerizability. However, when the thermal stability and others of the optically functional layer to be obtained are considered, it is preferred to use a polymerizable chiral agent which can be polymerized with the above-mentioned polymerizable liquid crystal compound so as to fix cholesteric regularity. In order to obtain an optical device good in heat resistance, it is particularly preferred that the agent has polymerizable functional groups at both terminals of the molecule thereof.

The optically functional layer may be composed of two or more optically functional layers different form each other, and the plural layers may be optically functional layers of the same type, or optically functional layers of different types selected from nematic regularity, smectic regularity, or cholesteric regularity.

The photopolymerization initiator added to the polymerizable liquid crystal compound is not particularly limited, and examples thereof include benzil, benzoin isobutyl ether, benzoin isopropyl ether, benzophenone, benzoylbenzoic acid, methyl benzoylbenzoate, 4-benzoyl-4'-methyldiphenylsulfide, benzyl methyl ketal, dimethylaminomethyl benzoate, 2-n-butoxyethyl-4-dimethylaminobenzoate, isoamyl p-dimethylaminobenzoate, 3'-dimethyl-4-methoxybenzophenone, methylobenzoyl formate, 2-methyl-1-(4-(methylthio)phenyl)-2-morpholinopropane-1-one, 2-benzyl-2-dimethylamino-1-(4-morpholinophenyl)-butane-1-one, 1-(4-dodecylphenyl)-2 hydroxy-2-methylpropane-1-one, 1-hydroxycyclohexyl phenyl ketone, 2-hydroxy-2-methyl-1 phenylpropane-1-one, 1-(4-isopropylphenyl)-2-hydroxy-2-methylpropane-1-one, 2-chlorothioxanthone, 2,4-diethylthioxanthone, 2,4-diisopropylthioxanthone, 2,4-dimethylthioxanthone, isopropylthioxanthone, and 1-chloro-4-propoxythioxanthone. Besides the photopolymerization initiator, a sensitizer can be added as long as the objects of the invention are not inhibited.

The addition amount of such a photopolymerization initiator is generally from 0.01 to 20 parts by mass, preferably from 0.1 to 10 parts by mass, and more preferably from 0.5 to 5 parts by mass for 100 parts by mass of the whole of the polymerizable liquid crystal compound.

Besides the above-mentioned liquid crystal compound, chiral agent, and photopolymerization initiator, the following may be added to the coating solution for forming the optically functional layer as long as the alignment of the liquid crystal compound is not inhibited: a surfactant, a non-liquid-crystal polymerizable monomer (for example, compounds having vinyl, vinyloxy, acryloyl and methacryloyl groups), and a polymer.

The solvent used in the coating solution for forming the optically functional layer is not particularly limited as long as the solvent is a solvent in which the above-mentioned liquid crystal compound and chiral agent can be dissolved and is further a solvent which does not inhibit alignment on the substrate having alignment property. Specific examples thereof include hydrocarbons (such as benzene and hexane), ketones (such as methyl ethyl ketone, methyl isobutyl ketone, and cyclohexanone), ethers (such as tetrahydrofuran, and 1,2-dimethoxy ethane), alkylhalides (such as chloroform, and dichloromethane), esters (such as methyl acetate, butyl acetate, and propylene glycol monomethyl ether acetate), amides (such as N,N-dimethylformamide), and sulfoxides (such as dimethylsulfoxide).

In the optical device according to the invention, the optically functional layer, wherein a polymerizable liquid crystal compound is used, is obtained by coating, onto the above-mentioned alignment film, a solution wherein the polymerizable liquid crystal compound and other compounds (and further, for example, a non-liquid-crystal polymerizable monomer, and a photopolymerization initiator) are dissolved in a solvent, drying the resultant, next heating the dried film to a liquid crystal phase forming temperature, radiating ultraviolet rays or electron beams onto the heated film so as to polymerize the polymerizable compound, and further cooling the resultant.

EXAMPLES

Example 1

1. Production of Film with Alignment Film (Formation of Photocurable Resin Layer)
A solution composed of 50 parts by mass of pentaerythritol tri-acrylate (PET-30, manufactured by Nippon Kayaku Co, Ltd.), 5 parts by mass of a photo-cleaving type photopolymerization initiator (1-hydroxy-cyclohexyl-phenyl-ketone: IRGACURE 184, manufactured by Ciba Specialty Chemicals), and 45 parts by mass of mixed solvents wherein toluene: MEK (methyl ethyl ketone) were mixed at a ratio by mass of 1/1 was coated onto a triacetylcellulose film by bar coating, and the resultant was dried at 60° C. for 5 minutes. A UV radiating device was used to radiate ultraviolet rays of 300 mJ/cm² energy thereto in the atmosphere of nitrogen to form a photocurable resin layer of 7 μm film thickness.

(Formation of Alignment Film)

A solution of a photo-alignment polymer having a cinnamoyl group was coated onto the above-mentioned photocurable resin layer to give a dry film thickness of 100 nm, and then the resultant was heated and dried at 100° C. for 5 minutes. Next, a polarized UV radiating device was used to radiate polarized ultraviolet rays of 200 mJ/cm² energy thereto in the atmosphere of nitrogen to form an alignment film. In this way, a film with alignment film according to the invention was produced.

(Evaluation of Adhesiveness)

A lattice pattern cutting test was made in accordance with JIS-K-5400. Specifically, eleven cut lines were made in the optically functional layer at intervals of 1 mm in each of the length and width directions to make 100 square pieces of 1 mm size. A cellophane tape was attached to this layer, and the tape was immediately peeled at an angle of 90 degrees. The number of the square pieces remaining without being peeled is represented by m, and the evaluation results are shown in Table 1 on the basis of the following evaluating criterion:

[Evaluating Criterion]

Good: 71≦m≦100 The adhesiveness is high and excellent.

Fair: 31≦m≦70

Poor: 0≦m≦30 The tape is remarkably peeled.

TABLE 1

| | | Evaluation results of the adhesiveness |
|---|---|---|
| Example 1 | Film with alignment film | ○ |
| | Optical device | ○ |
| Comparative Example 1 | Film with alignment film | x |
| | Optical device | x |

2. Production of Optical Device (Formation of Optically Functional Layer)

A polymerizable liquid crystal monomer was diluted with propyl acetate to prepare a 20% solution of a solid. This solution was coated onto the alignment film of the film with alignment film produced in the above-mentioned item 1 with a Mayer bar. The resultant was heated at 80° C. for 2 minutes to align the liquid crystal, and then a UV radiating device was used to radiate ultraviolet rays of 300 mJ/cm² energy thereto in the atmosphere of nitrogen to form an optically functional layer of 1 μm film thickness. In this way, an optical device according to the invention was obtained.

As regards the resultant optical device also, eleven cut lines were made in the optically functional layer painted surface at intervals of 1 mm in each of the length and width directions. The adhesiveness was evaluated in the same way as that for the above-mentioned film with alignment film. The results are shown in Table 1 together.

Comparative Example 1

1. Production of Film with Alignment Film

A film with alignment film was formed in the same way as in Example 1 except that a hydrogen abstraction type photopolymerization initiator (2,4-diethylthioxanthone: DETX-S, manufactured by Nippon Kayaku Co, Ltd.) was used as the photopolymerization initiator.

The adhesiveness was evaluated in the same way as in Example 1. As a result, it was recognized that the pieces were peeled in the whole surface on which the cellophane tape was attached. It was known by XPS analysis that the position where the peeling was caused was between the photocurable resin layer and the alignment film.

2. Production of Optical Device

Furthermore, an optically functional layer was formed on the alignment film of the film with alignment film formed in the above-mentioned item 1 in the same way as in Example 1. As regards the resultant optical device also, eleven cut lines were made in the optically functional layer coated surface at intervals of 1 mm in each of the length and width directions. The adhesiveness was evaluated in the same way as in Example 1. As a result, it was recognized that the pieces were peeled in the whole surface on which the cellophane tape was attached. It was known by XPS analysis that the position where the peeling was caused was between the photocurable resin layer and the alignment film. The results are shown in Table 1 together.

The invention claimed is:

1. A film with alignment film, comprising at least a resin substrate, and an alignment film, wherein the film is provided with a photocurable resin layer between the resin substrate and the alignment film, the photocurable resin layer being formed by use of a photo-cleaving type photopolymerization initiator.

2. The film with alignment film according to claim 1, wherein the alignment film includes a photo-alignment material which is irradiated with polarized ultraviolet rays so as to gain alignment performance.

3. The film with alignment film according to claim 1, wherein the photo-cleaving type photopolymerization initiator is one or more selected from the group consisting of acetophenone derivatives, phosphine oxide derivatives, bisimidazole derivatives, and titanocene derivatives.

4. The film with alignment film according to claim 1, wherein the resin substrate is a cellulose-based polymer.

5. The film with alignment film according to claim 1, wherein the photocurable resin layer is a layer obtained by curing a layer containing at least a photopolymerizable compound and a photo-cleaving type photopolymerization initiator by irradiation with light, and the photopolymerizable compound is a polyfunctional monomer and/or oligomer having in the molecule thereof two or more ethylenically unsaturated bonds.

6. An optical device comprising at least a resin substrate, an alignment film, and an optically functional layer, wherein the device is provided with a photocurable resin layer between the resin substrate and the alignment film, the photocurable resin layer being formed by use of a photo-cleaving type photopolymerization initiator.

7. The optical device according to claim 6, wherein the alignment film includes a photo-alignment material which is irradiated with polarized ultraviolet rays so as to gain alignment performance.

8. The optical device according to claim 6, wherein the photo-cleaving type photopolymerization initiator is one or more selected from the group consisting of acetophenone derivatives, phosphine oxide derivatives, bisimidazole derivatives, and titanocene derivatives.

9. The optical device according to claim 6, wherein the resin substrate is a cellulose-based polymer.

10. The film with alignment film according to claim 6, wherein the photocurable resin layer is a layer obtained by curing a layer containing at least a photopolymerizable compound and a photo-cleaving type photopolymerization initiator by irradiation with light, and the photopolymerizable compound is a polyfunctional monomer and/or oligomer having in the molecule thereof two or more ethylenically unsaturated bonds.

\* \* \* \* \*